United States Patent
Kurokawa et al.

(10) Patent No.: US 12,487,973 B2
(45) Date of Patent: Dec. 2, 2025

(54) UPDATE METHOD AND DATABASE UPDATE APPARATUS

(71) Applicant: Hitachi, Ltd., Tokyo (JP)

(72) Inventors: Yoshiki Kurokawa, Tokyo (JP); Toshihiko Kashiyama, Tokyo (JP); Norifumi Nishikawa, Tokyo (JP); Mayuko Ozawa, Tokyo (JP); Kazuhiko Mogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/440,999

(22) Filed: Feb. 14, 2024

(65) Prior Publication Data
US 2024/0362192 A1    Oct. 31, 2024

(30) Foreign Application Priority Data

Apr. 28, 2023   (JP) ................. 2023-074402

(51) Int. Cl.
| | |
|---|---|
| *G06F 16/182* | (2019.01) |
| *G06F 16/14* | (2019.01) |
| *G06F 16/172* | (2019.01) |
| *G06F 16/18* | (2019.01) |
| *G06F 16/188* | (2019.01) |

(52) U.S. Cl.
CPC ........ *G06F 16/1844* (2019.01); *G06F 16/144* (2019.01); *G06F 16/172* (2019.01); *G06F 16/1865* (2019.01); *G06F 16/188* (2019.01)

(58) Field of Classification Search
None
See application file for complete search history.

(56) References Cited

U.S. PATENT DOCUMENTS

| | | | |
|---|---|---|---|
| 2005/0210073 A1* | 9/2005 | Oeda | G06F 11/1471 |
| 2011/0072006 A1* | 3/2011 | Yu | G06F 16/24535 |
| | | | 707/718 |

(Continued)

FOREIGN PATENT DOCUMENTS

JP    2020-013318 A    1/2020

OTHER PUBLICATIONS

Zhangqing et al., "Processing method and device and electronic equipment", 2021 (Year: 2021).*

(Continued)

*Primary Examiner* — Dawaune A Conyers
(74) *Attorney, Agent, or Firm* — MATTINGLY & MALUR, PC

(57) ABSTRACT

An update method in which a computer updates data stored in a first storage device by copying a plurality of files stored in the first storage device to a second storage device and writing the files updated in the second storage device back to the first storage device, the plurality of files constituting a part of a database. The update method includes a query determination for determining whether a query for requesting writing to one of the files stored in the second storage device is based on a cluster key of the database, low-frequency file identification for identifying a file having a low writing frequency among the files stored in the second storage device, and write-back for writing the file having the low writing frequency identified in the low-frequency file identification to the first storage device.

2 Claims, 10 Drawing Sheets

(56) References Cited

U.S. PATENT DOCUMENTS

2013/0318196 A1* 11/2013 Yamamoto .......... G06F 12/0893
  709/215
2021/0133157 A1* 5/2021 Yin ................. G06F 3/0649
2023/0176974 A1* 6/2023 Shedge ............. G06F 12/0891

OTHER PUBLICATIONS

Liping et al., "Data storage method, system, electronic device and computer storage medium", 2021 (Year: 2021).*

* cited by examiner

UPDATE METHOD AND DATABASE UPDATE APPARATUS

CROSS-REFERENCE TO RELATED APPLICATION

The present application claims priority from Japanese application JP2023-074402, filed on Apr. 28, 2023, the content of which is hereby incorporated by reference into this application.

BACKGROUND OF THE INVENTION

1. Technical Field

The present invention relates to an update method and a database update apparatus.

2. Description of the Related Art

Since databases are required to be reliable, databases are generally stored in data centers or the like physically separated from database users. Communication between a database user and a database, therefore, often takes time due to a distance or the like, and as a countermeasure, a configuration in which a cache is provided on a database user side is known. JP 2020-13318 A discloses a database management system that performs an online transaction process (OLTP) for updating a database and online analytical processing (OLAP) for aggregating data accumulated in the database. The database management system includes a nonvolatile memory that stores row-oriented data for the OLTP and a memory management unit that stores, after a certain amount of data updated through the OLTP and held in a row-oriented manner is accumulated in the nonvolatile memory, the certain amount of accumulated data in a volatile memory in blocks in units of columns and that stores the blocks in units of columns in a secondary storage device different from the nonvolatile memory for the OLAP.

SUMMARY OF THE INVENTION

In the invention described in JP 2020-13318 A, there is room for consideration in shortening time required for updating the database. When a plurality of updates is performed, there is a method of storing updated data in the nonvolatile memory in the secondary storage device each time the update is performed. When the plurality of updates is in the same nonvolatile memory area, however, data in the same area undesirably needs to be sent to the secondary storage device many times. In general, since secondary storage devices are two or more digits slower than nonvolatile memories, repeated writing becomes a bottleneck, and it takes time to update a database. An object of the present invention is to solve this bottleneck in writing.

An update method according to a first aspect of the present invention is an update method in which a computer updates data stored in a first storage device by copying a plurality of files stored in the first storage device to a second storage device and writing files updated in the second storage device back to the first storage device, the plurality of files constituting a part of a database, the update method including a query determination for determining whether a query for requesting writing to one of the files stored in the second storage device is based on a cluster key of the database, low-frequency file identification for identifying a file having a low writing frequency among the files stored in the second storage device, and write-back for writing the file having the low writing frequency identified in the low-frequency file identification to the first storage device.

A database update apparatus according to the first aspect of the present invention is a database update apparatus that updates data stored in a first storage device by copying a plurality of files stored in the first storage device to a second storage device and writing files updated in the second storage device back to the first storage device, the plurality of files constituting a part of a database, the database update apparatus including a query determination unit that determines whether a query for requesting writing to one of the files stored in the second storage device is based on a cluster key of the database, a low-frequency file identification unit that identifies a file having a low writing frequency among the files stored in the second storage device, and a write-back unit that writes the file having the low writing frequency identified by the low-frequency file identification unit to the first storage device.

According to the present invention, it is possible to shorten a time required for updating a database.

DETAILED DESCRIPTION

First Embodiment

An update method and a database update apparatus according to a first embodiment will be described hereinafter with reference to FIGS. 1 to 7.

Figure 1:
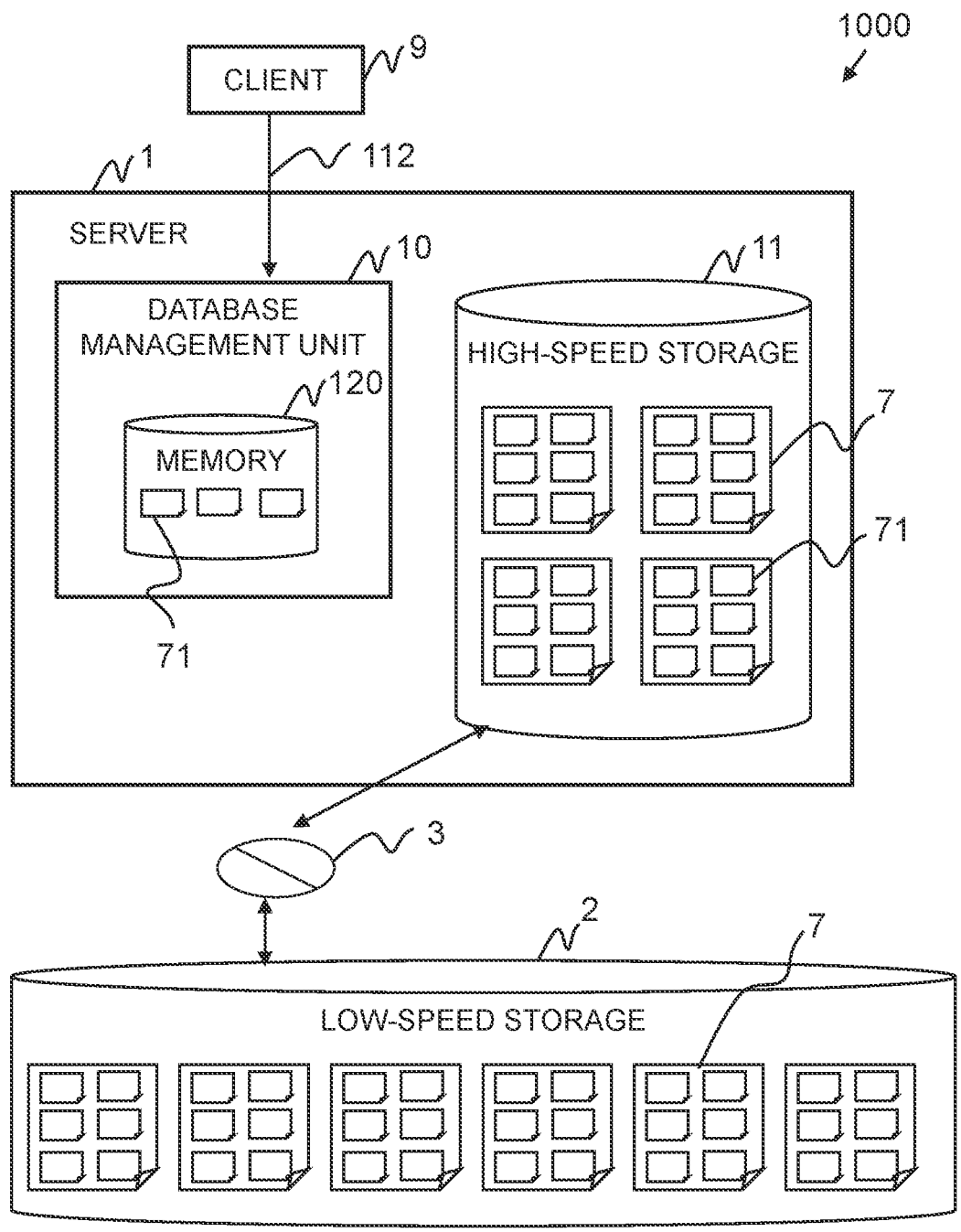
FIG. 1 is a configuration diagram of a database system.

FIG. 1 is a configuration diagram of a database system 1000. The database system 1000 includes a server 1, a low-speed storage 2, and a client 9. The server 1 and the low-speed storage 2 are connected to each other over a network 3. The network 3 may be the Internet, or may be any of a wide-area network, a closed network, and a local communication network. The client 9 transmits, to the server 1, a query 112 including a write instruction to a database management unit 10, which will be described later.

The server 1 includes the database management unit 10 and a high-speed storage 11. A detailed configuration of the database management unit 10 will be described later, but at least a memory 120 is provided. The high-speed storage 11 is, for example, a solid-state drive (SSD) or an array of SSDs, and the memory 120 is, for example, a DRAM. In the following description, the low-speed storage 2 will also be referred to as a "first storage device", and the high-speed storage 11 will also be referred to as a "second storage device".

The low-speed storage 2 includes a nonvolatile storage device such as a hard disk drive (HDD). The low-speed storage 2 may be a storage product having a network connection function or a storage area provided as an online storage service. FIG. 1 merely illustrates a concept of the low-speed storage 2, and the low-speed storage 2 may be achieved by a plurality of pieces of hardware, or a redundant configuration may be configured in different geographical environments.

The memory 120, the high-speed storage 11, and the low-speed storage 2 are all storage areas, but there are large differences in access speed. More specifically, access to the memory 120 is the fastest, access to the high-speed storage 11 is moderate, and access to the low-speed storage 2 is the slowest. The low-speed storage 2 stores all data handled by the database management unit 10. The high-speed storage 11 and the memory 120 store part of the data handled by the database management unit 10. The database management unit 10 stores all the data while dividing the data into cache files 7, and the cache files 7 each include a plurality of pages 71.

The memory 120 stores a plurality of pages 71. The high-speed storage 11 and the low-speed storage 2 store the plurality of cache files 7. The high-speed storage 11 communicates data with the memory 120 in units of pages 71 and with the low-speed storage 2 in units of cache files 7. There is no direct data communication between the low-speed storage 12 and the memory 120. Note that the number of pages 71 stored in the memory 120, the number of pages 71 constituting each cache file 7, the number of cache files 7 stored in the high-speed storage 11, and the number of cache files 7 stored in the low-speed storage 2 in FIG. 1 are merely examples.

The database management unit 10 reads and writes data from and in a virtual memory space, which is a virtually provided memory space. The database management unit 10 partitions the virtual memory space by a certain level of granularity, and handles, as one file, data stored in each of areas of the partitioned virtual memory space obtained. A file name of the file is determined on the basis of an address of the corresponding area of the partitioned virtual memory space. For example, a first address of the area of the partitioned virtual memory space itself may be used as the file name, a value obtained by dividing the first address of the area of the partitioned virtual memory space by a certain value may be used as the file name, or a central or last address of the area of the partitioned virtual memory space may be used as the file name. Regardless of which naming rule is employed, file names of cache files 7 are continuous in continuous areas in the virtual memory space.

Figure 2:
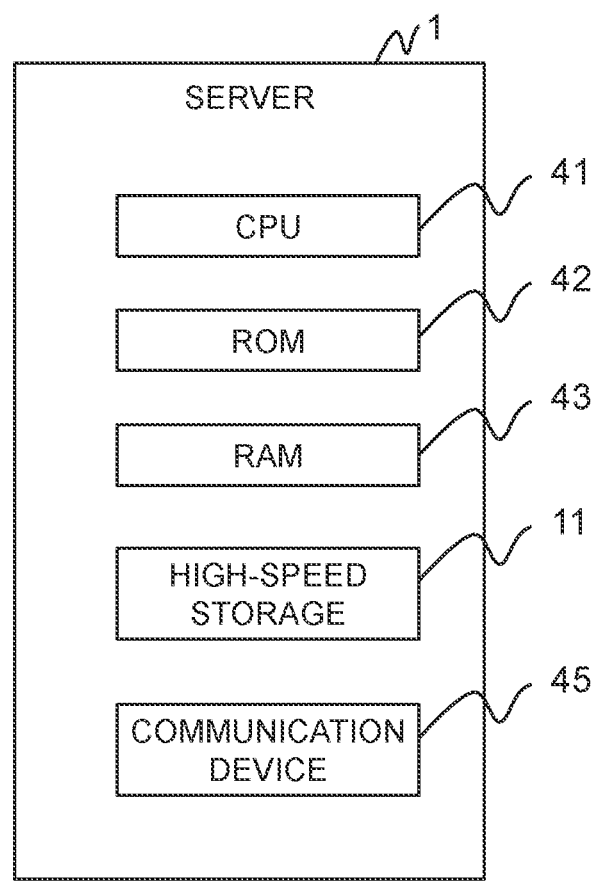
FIG. 2 is a hardware configuration diagram of a server.

FIG. 2 is a hardware configuration diagram of the server 1. The server 1 includes a central processing unit (CPU) 41, a read-only memory (ROM) 42, a random-access memory (RAM) 43 that is a readable/writable storage device, the high-speed storage 11, and a communication device 45. The memory 120 illustrated in FIG. 1 is an area in the RAM 43. The RAM 43 is, for example, a dynamic random-access memory (DRAM). The communication device 45 achieves communication with the low-speed storage 2 over the network 3.

The CPU 41 performs various calculations by loading a program stored in the ROM 42 into the RAM 43 and executing the program. The server 1 may be achieved by a field-programmable gate array (FPGA), which is a rewritable logic circuit, or an application-specific integrated circuit (ASIC), which is an integrated circuit for a certain application, instead of a combination of the CPU 41, the ROM 42, and the RAM 43. Alternatively, instead of the combination of the CPU 41, the ROM 42, and the RAM 43, the server 1 may be achieved by a combination of different configurations, that is, for example, a combination of the CPU 41, the ROM 42, the RAM 43, and an FPGA.

Figure 3:
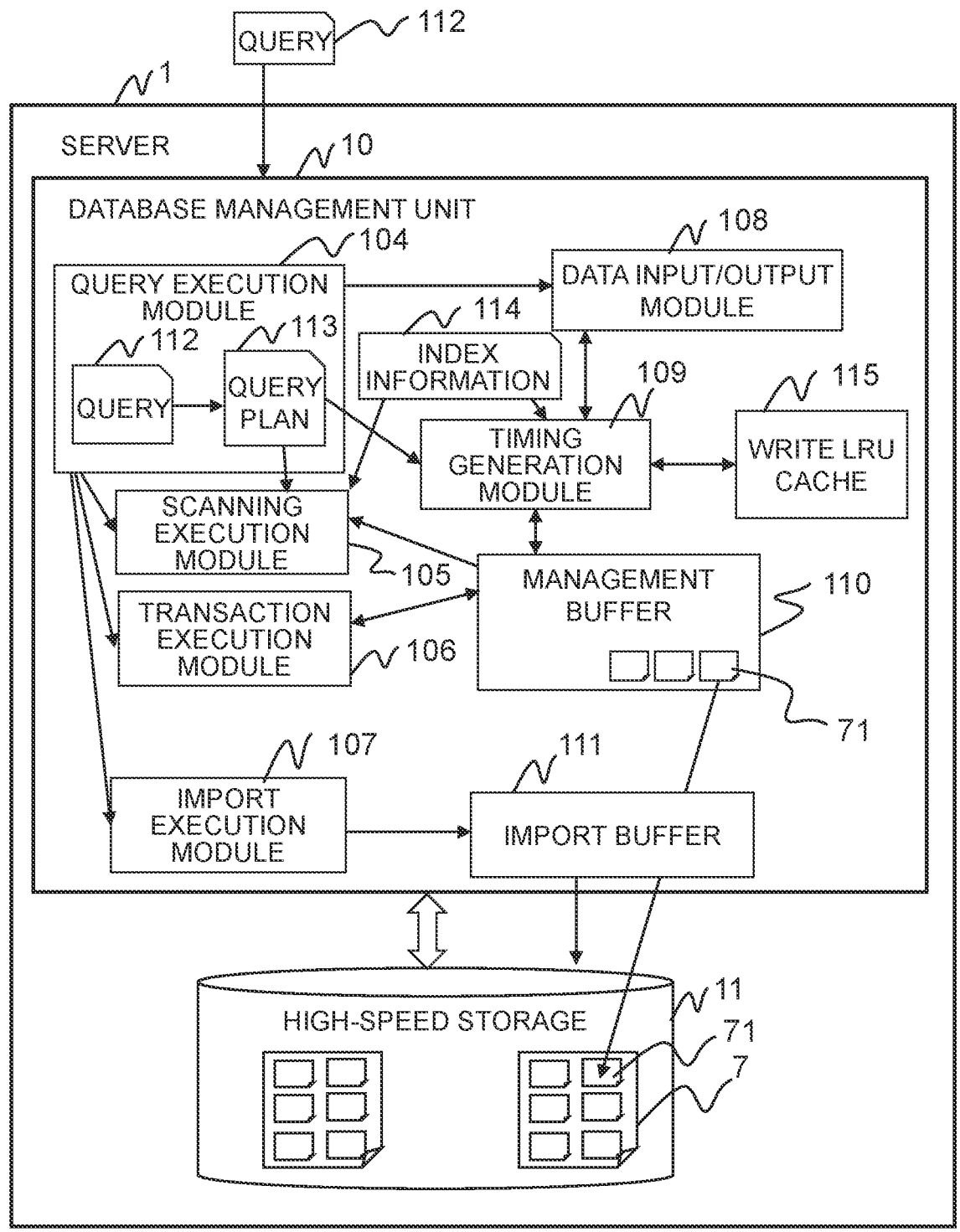
FIG. 3 is a configuration diagram of a database management unit.

FIG. 3 is a configuration diagram of the database management unit 10. The database management unit 10 includes a query execution module 104, a scanning execution module 105, a transaction execution module 106, an import execution module 107, a data input/output module 108, a timing generation module 109, a management buffer 110, an import buffer 111, a query plan 113, index information 114, and a write LRU cache 115.

The client 9 receives an operation of the database management unit 10 from a user (not illustrated) and inquires of the database management unit 10 in the form of a query 112. The client 9 also receives a result of an operation from the database management unit 10 and presents the result to the user. The server 1 is computer hardware on which the database management unit 10 operates, and incorporates the high-speed storage 11. The server 1 is connected to a client 9, which is an external terminal, and the low-speed storage 2 over the network 3. The database management unit 10 receives the query 112 from the client 9, searches and writes data using various modules, and returns a processing result to the client 9.

The query execution module 104 interprets the query 112 received from the client 9 and converts the query 112 into a query plan 113, which is a sequence of instructions executable by the scanning execution module 105, the transaction execution module 106, and the import execution module 107. The query execution module 104 sequentially transmits execution commands to the scanning execution module 105, the transaction execution module 106, and the import execution module 107 on the basis of the query plan 113.

In response to a scanning execution command in the query plan 113 generated by the query execution module 104, the scanning execution module 105 executes scanning, that is, search, of data stored in the database management unit 10. Search results obtained by the scanning execution module 105 are returned to the query execution module 104, aggregated, and finally returned to the client 9.

The transaction execution module 106 executes a transaction on a selected specific row of the data stored in the database management unit 10 on the basis of a transaction execution command in the query plan 113 generated by the query execution module 104. An execution result of the transaction executed by the transaction execution module 106 is returned to the query execution module 104 and finally returned to the client 9. The import execution module 107 reads data from the outside of the database management unit 10 on the basis of an import execution command in the query plan 113 generated by the query execution module 104 and stores the data as internal data of the database management unit 10.

The data input/output module 108 receives data read or write requests from the scanning execution module 105, the transaction execution module 106, and the import execution module 107. The data input/output module 108 determines whether a page 71 (hereinafter referred to as a "target page") to be read or written exists in the management buffer 110 and, if the target page exists in the management buffer 110, reads data from the management buffer 110 or, if the target page does not exist in the management buffer 110, makes a following determination.

That is, the data input/output module 108 determines whether the target page exists in the high-speed storage 11 and, if the target page exists in the high-speed storage 11, reads the target page from the high-speed storage 11 or, if the target page does not exist in the high-speed storage 11, reads a cache file 7 including the target page from the low-speed storage 2. Necessary data in the cache file read from the high-speed storage 11 is stored in the management buffer 110. When the cache file 7 is read from the low-speed storage 2, the cache file 7 is also stored in the high-speed storage 11. Note that writing to the low-speed storage 2 is performed under the initiative of the timing generation module 109. More specifically, the data input/output module 108 writes the write target determined by the timing generation module 109 to the low-speed storage 2 at a timing determined by the timing generation module 109.

When the timing generation module 109 receives a data write instruction from the data input/output module 108, the timing generation module 109 determines whether a cache file 7 to be written exists in the high-speed storage 11. If the target cache does not exist in the high-speed storage 11, the timing generation module 109 reads the target cache from the low-speed storage 2, stores the target cache in the high-speed storage 11, and writes data to the target cache. The timing generation module 109 then writes the target cache to the low-speed storage 2 in a case where a specific condition is satisfied. The timing generation module 109 refers to the index information 114 and the write LRU cache 115 for this determination. The operation of the timing generation module 109 will be described in detail later.

The management buffer 110 is a storage area in which the scanning execution module 105 and the transaction execution module 106 can read and write at high speed. The management buffer 110 temporarily stores table data and management data obtained on the basis of read requests from the scanning execution module 105 and the transaction execution module 106. The management buffer 110 also temporarily stores write data based on write requests from the scanning execution module 105 and the transaction execution module 106. As described above, the management buffer 110 stores data in units of pages 71, and the pages 71 of the management buffer 110 are written to an appropriate cache file 7 of the high-speed storage 11 at an appropriate timing. Writing of a cache file 7 from the high-speed storage 11 to the low-speed storage 2 is performed on the basis of an instruction from the timing generation module 109.

The import buffer 111 is a write data buffer used by the import execution module 107. The query 112 is a request transmitted from the client 9 to the database management unit 10. The query 112 is, for example, request processes including searching, combining, and importing of database data. In general, one query 112 is combined with a plurality of request processes, but the number of request processes included in one query 112 is not particularly limited. The query execution module 104 generates the query plan 113 by interpreting the query 112 transmitted from the client 9. The query plan 113 is obtained by decomposing the query 112, which is a complex request, and is a list of simple scanning processes and transaction processes.

In order to process data from the database management unit 10 at high speed, the data is organized and a result of the organization is stored in the database as the index information 114. The use of the index information 114 makes it possible to determine whether arrangement of data is local.

The write LRU cache 115 is a least recently used (LRU) list in which a history of writing data to the cache files 7 in the high-speed storage 11 is recorded. The write LRU cache 115 is updated each time data is written to the cache files 7 stored in the high-speed storage 11. The write LRU cache 115 is configured such that the cache files 7 are arranged in order from the most recently accessed cache file 7.

Figure 4:
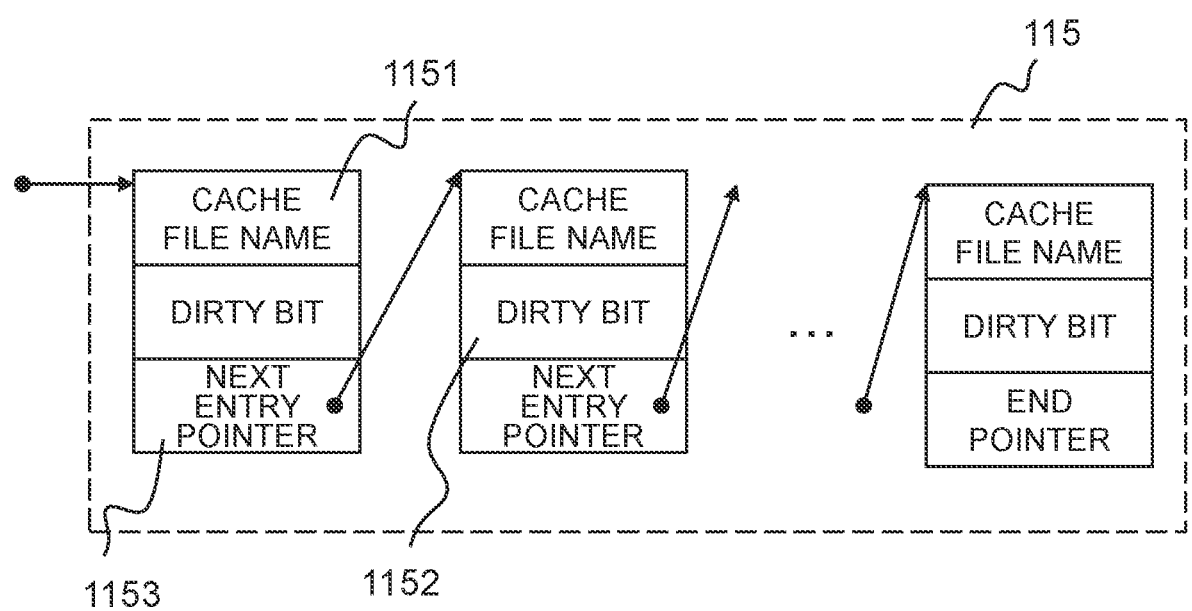
FIG. 4 is a diagram illustrating a structure of a write least recently used (LRU) cache.

FIG. 4 is a diagram illustrating a structure of the write LRU cache 115. The write LRU cache 115 is, for example, a finite-length list and includes a plurality of entries. Each of the entries included in the write LRU cache 115 includes a cache file name 1151, a dirty bit 1152, and a next entry pointer 1153.

The cache file name 1151 is a name of a cache file 7 written from the database management unit 10. The dirty bit 1152 is a Boolean value indicating whether writing from the database management unit 10 has been reflected in the low-speed storage 2. When the database management unit 10 performs writing on a cache file 7, the dirty bit 1152 is set to "1", and when the cache file 7 is written to the low-speed storage 2, the dirty bit is set to "0". The next entry pointer 1153 is an address at which a next entry is stored. The next entry pointer 1153 in a last entry, however, is an end pointer indicating that there is no subsequent entry.

The write LRU cache 115 is updated each time the database management unit 10 performs writing to the high-speed storage 11. Here, when a written cache file 7 is referred to as a "write target file", a method for updating the write LRU cache 115 differs depending on whether the write target file is described as a cache file name 1151 in one of the entries included in the write LRU cache 115.

First, a case where a write target file is described as a cache file name 1151 in one of the entries included in the write LRU cache 115 will be described. Here, however, the entry in which the write target file is described as the cache file name 1151 will be referred to as a "target entry". In this case, the dirty bit 1152 of the target entry is set to "1", and the next entry pointer 1153 of the target entry is set to an address of an entry that was previously a first entry.

Next, a case where a write target file is not described as a cache file name 1151 in any of the entries included in the write LRU cache 115 will be described. In this case, an entry is newly created. The cache file name 1151 of the entry is set to the write target file, the dirty bit 1152 is set to "1", and the next entry pointer 1153 is set to an address of an entry that was previously a first entry. Although the write LRU cache 115 is implemented as a list in the present embodiment, the write LRU cache 115 may be implemented in a different manner, that is, for example, as an array, instead.

Figure 5:
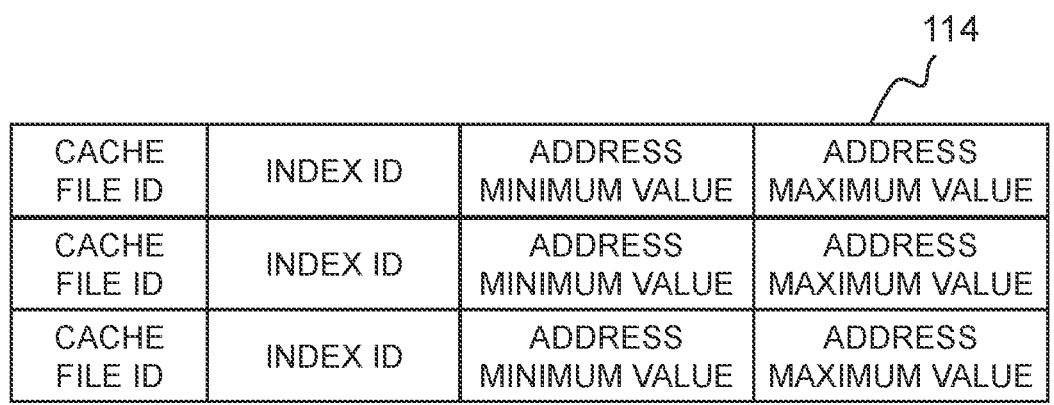
FIG. 5 is a diagram illustrating a structure of index information.

FIG. 5 is a diagram illustrating a structure of the index information 114. The index information 114 includes a plurality of entries. Each of the entries includes a cache file identifier (ID), an index ID, an address minimum value, and an address maximum value. The cache file ID is an identifier of a cache file 7, that is, a file name of a cache file 7. The index ID is an identifier of an index. The address minimum value and the address maximum value indicate a range of addresses in the virtual memory space.

Figure 6:
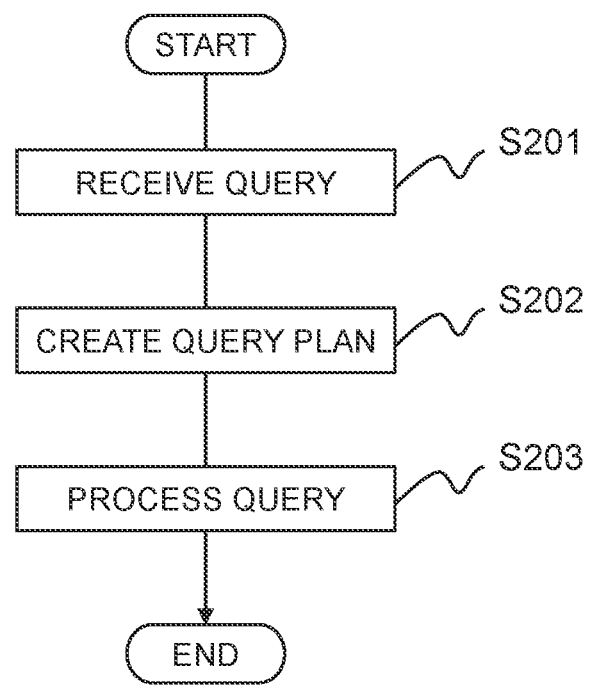
FIG. 6 is a flowchart illustrating processing performed by a query execution module.

FIG. 6 is a flowchart illustrating a process performed by the query execution module 104. The query execution module 104 first receives a query 112 from the client 9 in step S201. In a next step S202, the query execution module 104 interprets the query 112 and creates a query plan 113. The query plan 113 is used in step S208, which will be described later. In a next step S203, the query execution module 104 processes the query 112 by executing the query plan 113 created in step S202.

Figure 7:
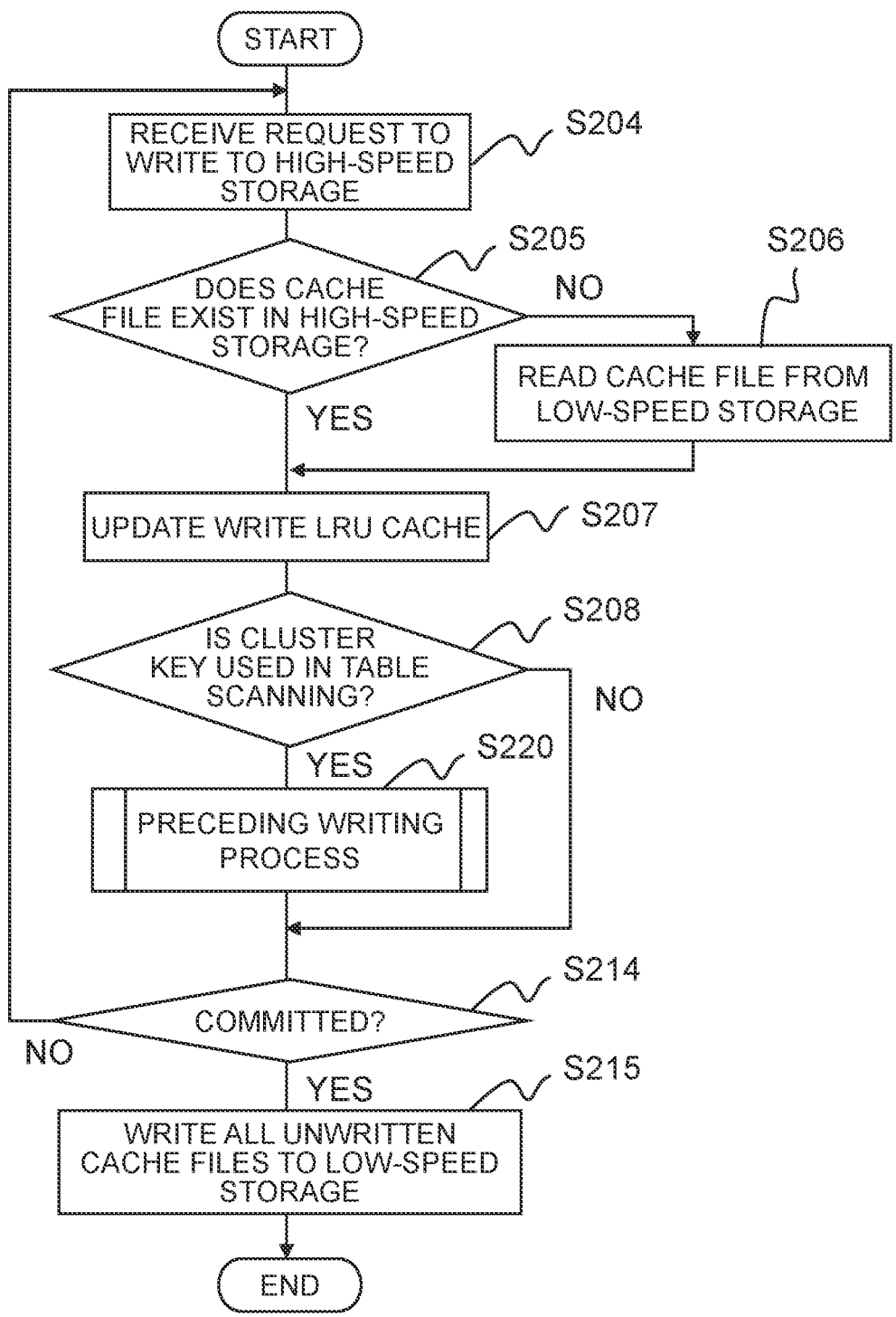
FIG. 7 is a flowchart illustrating processing performed by a timing generation module.

FIG. 7 is a flowchart illustrating a process performed by the timing generation module 109. First, in step S204, the timing generation module 109 receives a request to write a page 71 to the high-speed storage 11 in transaction update processing from the query execution module 104 or the data input/output module 108. In a next step S205, the timing generation module 109 identifies a cache file 7 to which the page 71 is to be written with reference to the index information 114 and determines whether the cache file 7 exists in the high-speed storage 11. The timing generation module 109 proceeds to step S207 when determining that the target cache file 7 exists in the high-speed storage 11 or proceeds to step S206 when determining that the target cache file 7 does not exist in the high-speed storage 11.

In step S206, the timing generation module 109 reads the target cache file 7 from the low-speed storage 2, stores the read cache file 7 in the high-speed storage 11, and proceeds to step S207. In step S207, the timing generation module 109 writes the page 71 to the target cache file 7 stored in the high-speed storage 11. In a next step S207, the timing generation module 109 updates the write LRU cache 115. That is, the write LRU cache 115 is updated in such a way as to indicate that the cache file 7 to be written in step S207 has been used most recently.

In a next step S208, the timing generation module 109 refers to the query plan 113 and determines whether a search in the current transaction update uses a cluster key. This determination can be rephrased as whether the search in the current transaction update constitutes a cluster or whether the cache file 7 to be searched for can be identified. The timing generation module 109 proceeds to step S220 when determining that the search in the current transaction update uses a cluster key, or proceeds to step S214 when determining that the search in the current transaction update does not use a cluster key. Note that the processing in step S208 will also be referred to as a "query determination", and a function of achieving the processing in step S208 will also be referred to as a "query determination unit" hereinafter.

Step S220 is a preceding writing process. Details of the preceding writing process will be described later with reference to FIG. 8. When the preceding writing process ends, the timing generation module 109 proceeds to step S214.

In step S214, the timing generation module 109 determines whether the transaction processing has been committed. The timing generation module 109 proceeds to step S215 when determining that the transaction processing has been committed, or returns to step S204 when determining that the transaction processing has not been committed. In step S215, the timing generation module 109 writes all unwritten cache files 7 stored in the high-speed storage 11 to the low-speed storage 2 and ends the process illustrated in FIG. 7. Note that the processing in step S215 will also be referred to as "commitment processing", and a function of achieving the processing in step S215 will also be referred to as a "commitment processing unit" hereinafter.

Figure 8:
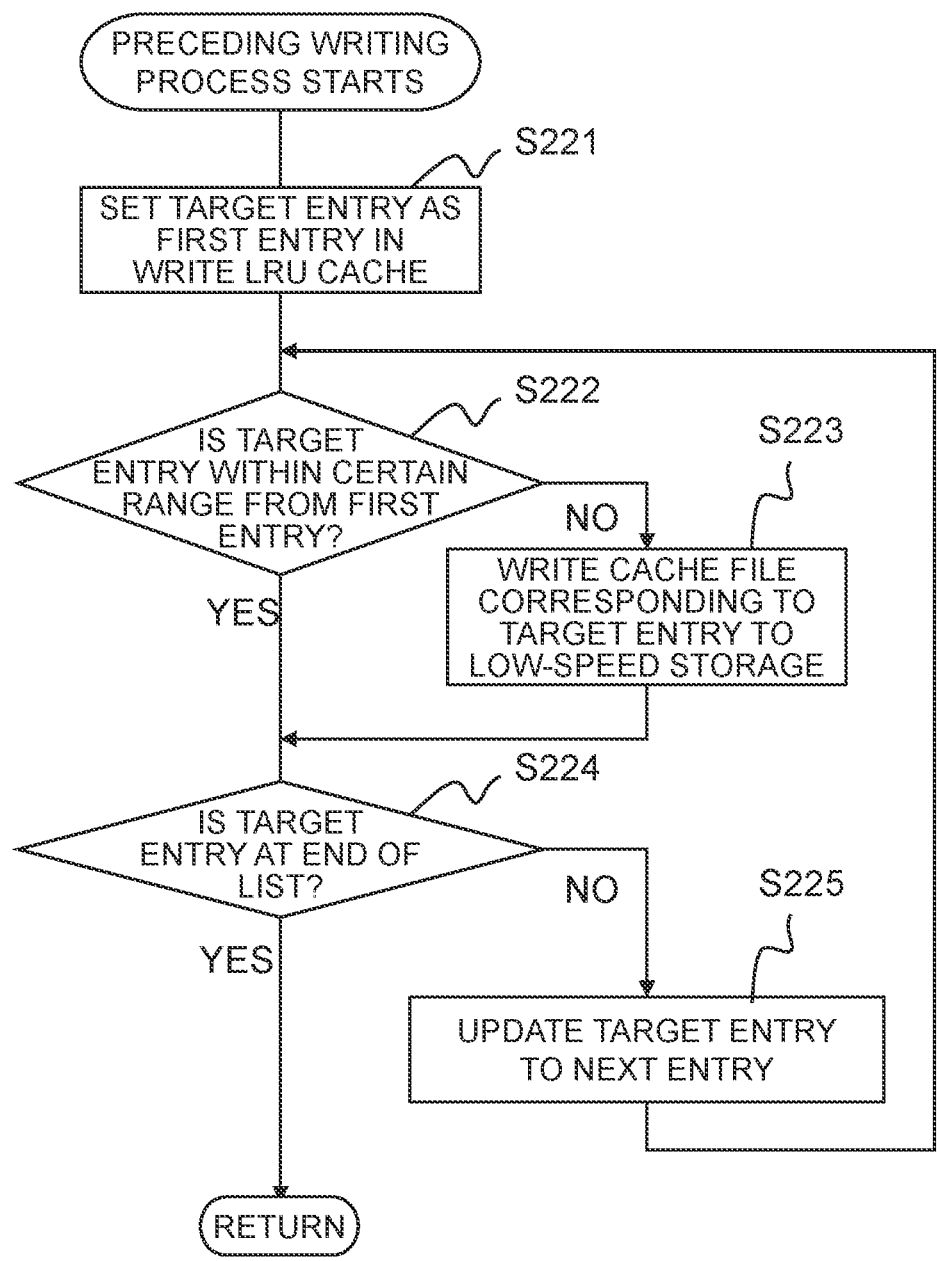
FIG. 8 is a flowchart illustrating details of a preceding writing process in FIG. 7.

FIG. 8 is a flowchart illustrating details of the preceding writing process illustrated in FIG. 7. In step S221, the timing generation module 109 sets a target entry, which is an entry in the write LRU cache 115 to be processed, as a first entry in the write LRU cache 115, and proceeds to step S222. In step S222, the timing generation module 109 determines whether the target entry is within a certain range from the first entry. The certain range is a predetermined constant, that is, for example, 100. The timing generation module 109 proceeds to step S224 when determining that the target entry is within the certain range from the first entry, or proceeds to step S223 when determining that the target entry is not within the certain range from the first entry. Note that the processing in step S222 will also be referred to as "low-frequency file identification", and a function of achieving the processing in step S222 will also be referred to as a "low-frequency file identification unit" hereinafter.

In step S223, the timing generation module 109 writes a cache file 7 corresponding to the target entry to the low-speed storage 2, and proceeds to step S224. Note that the processing in step S223 will also be referred to as "write-back", and a function of achieving the processing in step S223 will also be referred to as a "write-back unit". In step S224, the timing generation module 109 determines whether the target entry is at an end of the list, that is, a last entry in the write LRU cache 115. The timing generation module 109 ends the process illustrated in FIG. 8 when determining that the target entry is at the end of the list, or proceeds to step S225 when determining that the target entry is not at the end of the list. In step S225, the timing generation module 109 updates the target entry to a next entry in the write LRU cache 115 and returns to step S222.

Note that, in a case where the transaction processing is not committed and rollback is required, one of various known methods can be used. For example, when the low-speed storage 2 has a function, which is called snapshot or shadow copy, of returning a file to a state before updating, the function may be used. In a case where a cache file 7 is not overwritten at a time of writing to the low-speed storage 2 but the cache file 7 is saved under another name to which a timestamp or the like is added and a file name is changed to an original file name at a time of commitment, deletion of the file saved under another name corresponds to the rollback.

According to the first embodiment described above, following operational effects can be produced.

(1) A method for updating data stored in the low-speed storage 2 executed by the database management unit 10 of the server 1 includes the following query determination, low-frequency file identification, and write-back. The server 1 copies a plurality of files stored in the low-speed storage 2 to the high-speed storage 11, and writes files updated in the high-speed storage 11 back to the low-speed storage 2 to update data stored in the low-speed storage 2. A plurality of cache files 7 stored in the low-speed storage 2 constitutes a part of the database. The query determination (step S208 in FIG. 7) for determining whether a query 112 for requesting writing to a file stored in the high-speed storage 11 is based on a cluster key of the database, the low-frequency file identification (step S222 in FIG. 8) for identifying a file having a low writing frequency among files stored in the high-speed storage 11, and the write-back (step S223 in FIG. 8) for writing the file having the low writing frequency identified through the low-frequency file identification to the low-speed storage 2 are included in the method. By writing a subset of the cache files 7 to the low-speed storage 2 in advance, therefore, time taken to update the database can be shortened.

(2) The write LRU cache update (step S207 in FIG. 7) for updating the write LRU cache 115, in which order of update of files is recorded by recording an identifier of a file each time a file in the high-speed storage 11 is updated is included in the method. The low-frequency file identification includes reference to the write LRU cache 115. Writing to the cache files 7 in the high-speed storage 11, therefore, can be recorded using the write LRU cache 115, and a cache file 7 that has not been updated recently can be identified.

(3) In the write LRU cache 115, order of update of files after a transaction is started is recorded. The commitment processing, in which, if the transaction is committed (YES in S214), all cache files 7 that have not been written to the low-speed storage 2 after update among the cache files 7 stored in the high-speed storage 11 are written to the low-speed storage 2 (step S215 in FIG. 7), is included in the method.

First Modification

Figure 9:
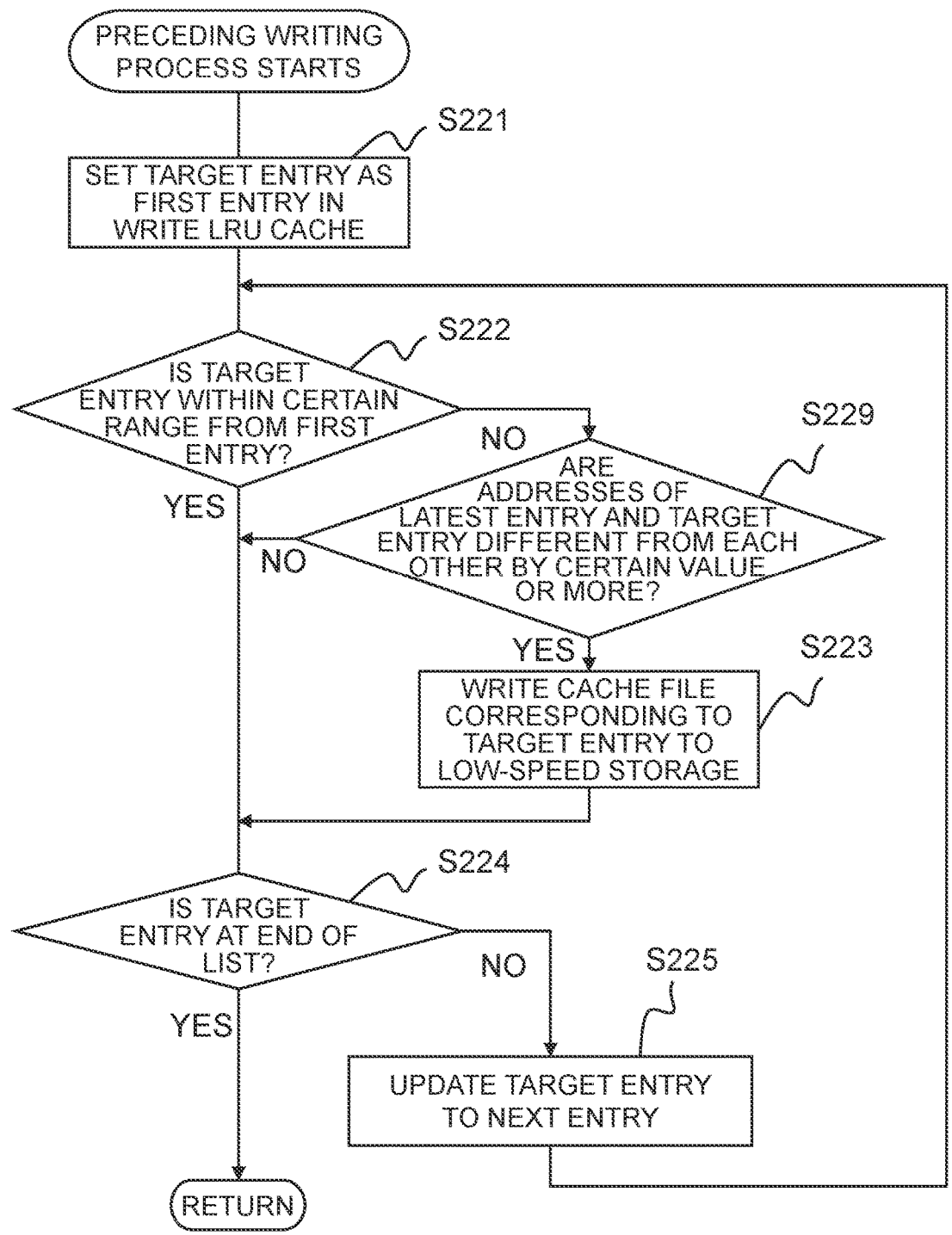
FIG. 9 is a flowchart illustrating details of a preceding writing process in a first modification.

FIG. 9 is a flowchart illustrating details of a preceding writing process in a first modification. A difference between FIG. 8 referred to in the first embodiment and FIG. 9 in the present modification is that step S229 is added. If the result of the determination in step S222 is negative, the process proceeds to step S229. In step S229, the timing generation module 109 determines whether corresponding addresses of a latest entry in the write LRU cache 115 and the target entry are different from each other by a certain value or more. The timing generation module 109 proceeds to step S223 when determining that the corresponding addresses of the latest entry and the target entry are different from each other by the certain value or more, or proceeds to step S224 when determining that the difference between the corresponding addresses of the latest entry and the target entry is smaller than the certain value.

According to the first modification, the following operational effect can be produced.

(4) Each of the cache files 7 is obtained by cutting out a specific area in the virtual memory space, which is a virtually provided memory space to which addresses are assigned. An additional condition is that an address in the virtual memory space written by the query 112 used for the determination in the query determination be different, by a certain value or more, from an address in the virtual memory space corresponding to the write target file to be written to the low-speed storage 2 in the write-back (step S229 in FIG. 9). It is therefore possible to inhibit the writing (S223), to the low-speed storage 2, of a cache file 7 whose virtual address is relatively close to that of a latest entry, that is, a cache file 7 assumed to be written again with a high possibility.

Second Modification

Figure 10:
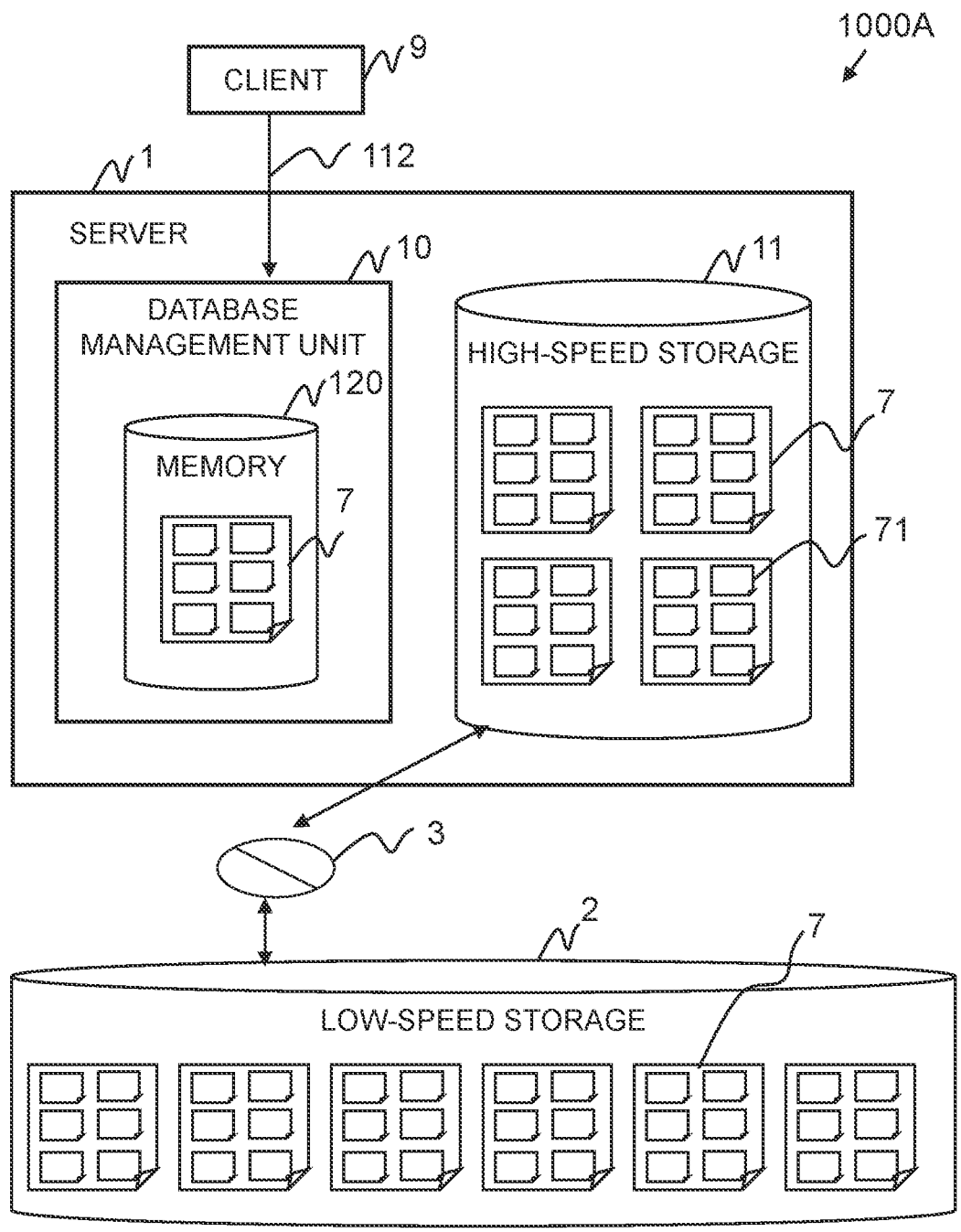
FIG. 10 is a configuration diagram of a database system in a second modification.

FIG. 10 is a configuration diagram of a database system 1000A in a second modification. A difference from the above-described embodiment is that data is stored in the memory 120 of the server 1 not in units of pages 71 but in units of cache files 7. There is no difference, however, in other configurations, and the processing of the flowcharts illustrated in FIGS. 6 to 8 is similar.

Third Modification

In the embodiment described above, the low-speed storage 2 is connected to the server 1 over the network 3. The low-speed storage 2, however, may be connected to the server 1 without the network 3, or the low-speed storage 2 may be built in the server 1, instead. In addition, the high-speed storage 11 may be disposed outside the server 1 and connected to the server 1 over the network 3 similarly to the low-speed storage 2, instead. The memory 120, the high-speed storage 11, and the low-speed storage 2 are required to have different response times, but physical positional relationships are not limited at all. The differences in response time may be caused by physical distances, hardware performance, or software processing. The differences in response time caused by the software processing may be due to, for example, a high or low level of priority of processing.

Fourth Modification

In the above-described embodiment, writing to the high-speed storage 11 by the database management unit 10 is managed using the write LRU cache 115. The use of the write LRU cache 115, however, is not mandatory, and it is only required that information that enables the determination in step S222 in FIG. 8 be created. For example, a list of file names of a certain number of cache files 7 that have been most recently updated may be held, or a list of cache files 7 on which writing has not been performed in the most recent certain number of writings may be held.

Fifth Modification

In the above-described embodiment, the preceding writing process in step S220 is performed only if the result of the determination in step S208 is positive. Step S220, however, may be performed under a condition other than the result of the determination in step S208 being not positive. For example, step S220 may be performed whenever step S207 is executed or each time step S207 has been performed a certain number of times, that is, for example, 10 times. Furthermore, regardless of the execution of step S207, step S220 may be performed at certain time intervals, that is, for example, every 30 seconds.

The configuration of the functional blocks in the above-described embodiment and modifications is merely an example. Some functional components illustrated as separate functional blocks may be integrally configured, or a component illustrated in one functional block diagram may be divided into two or more functions. In addition, some of the functions of each functional block may be included in another functional block.

In each of the above-described embodiment and modifications, the program of the server 1 is stored in the ROM 42, but the program may be stored in a nonvolatile storage device (not illustrated), instead. In addition, the server 1 may include an input/output interface (not illustrated), and the program may be read, when necessary, from another apparatus via the input/output interface and a medium available to the server 1. Here, the medium refers to, for example, a storage medium detachable from the input/output interface, a communication medium, that is, a wired, wireless, or optical network, or a carrier wave or a digital signal propagating through the network. A subset or all of the functions achieved by the program may be achieved by a hardware circuit or a field-programmable gate array (FPGA), instead.

The above-described embodiment and modifications may be combined together in any manner. Although various embodiments and modifications have been described above, the present invention is not limited to these. Other aspects conceivable within the scope of the technical idea of the present invention are also included within the scope of the present invention.

What is claimed is:

1. An update method in which a computer updates data stored in a first storage device by copying a plurality of files stored in the first storage device to a second storage device, which has a faster access speed than the first storage device, and writing the files updated in the second storage device back to the first storage device, the plurality of files constituting a part of a database, the update method comprising:
    a query determination for determining whether a query for requesting writing to one of the files stored in the second storage device is based on a cluster key of the database;
    low-frequency file identification for identifying a file having a low writing frequency among the files stored in the second storage device;
    write-back for writing the file having the low writing frequency identified in the low-frequency file identification to the first storage device;

write a least recently used cache update for updating a write least recently used cache, in which order of update of the files is recorded by recording an identifier of the file each time the file in the second storage device is updated; and commitment processing for writing, to the first storage device, all the files that have not been written to the first storage device after update among the files stored in the second storage device in a case where the transaction is committed, wherein the low-frequency file identification includes reference to the write least recently used cache, wherein the write-back is performed in a case where it is determined in the query determination that the query is based on the cluster key of the database, wherein, in the write least recently used cache, order of update of the files after a transaction is started is recorded, wherein each of the files is obtained by cutting out a specific area in a virtual memory space, which is a virtually provided memory space to which addresses are assigned, and an additional condition is that an address in the virtual memory space written by the query used for the determination in the query determination be different, by a certain value or more, from an address in the virtual memory space corresponding to the write target file to be written to the first storage device in the write-back.

2. A database update apparatus that updates data stored in a first storage device by copying a plurality of files stored in the first storage device to a second storage device, which has a faster access speed than the first storage device, and writing the files updated in the second storage device back to the first storage device, the plurality of files constituting a part of a database, the database update apparatus comprising:

a memory storing a program;

a processor which, when executing the program stored in the memory, configures the processor to:

determine whether a query for requesting writing to one of the files stored in the second storage device is based on a cluster key of the database;

identify a file having a low writing frequency among the files stored in the second storage device; and write the file having the identified low writing frequency to the first storage device;

write a least recently used cache update for updating a write least recently used cache, in which order of update of the files is recorded by recording an identifier of the file each time the file in the second storage device is updated; and perform commitment processing for writing, to the first storage device, all the files that have not been written to the first storage device after update among the files stored in the second storage device in a case where a transaction is committed, wherein the low-frequency file identification includes reference to the write least recently used cache, wherein a write-back is performed in a case where it is determined in the query determination that the query is based on the cluster key of the database, wherein, in the write least recently used cache, order of update of the files after a transaction is started is recorded, wherein each of the files is obtained by cutting out a specific area in a virtual memory space, which is a virtually provided memory space to which addresses are assigned, and an additional condition is that an address in the virtual memory space written by the query used for the determination by the query determination unit be different, by a certain value or more, from an address in the virtual memory space corresponding to the write target file to be written to the first storage device by the processor.

* * * * *